United States Patent [19]

Martino et al.

[11] Patent Number: 5,237,083
[45] Date of Patent: Aug. 17, 1993

[54] SYNTHETIC ORGANOSILANE COMPOUNDS USEFUL AS LUBRICANTS IN GLASS SIZING COMPOSITIONS

[75] Inventors: Gary T. Martino, Plainsboro, N.J.; Michael J. Hasuly, Greer, S.C.; John J. Tsai, Belle Meade, N.J.

[73] Assignee: National Starch and Chemical Investment Holding Corporation, Wilmington, Del.

[21] Appl. No.: 846,313

[22] Filed: Mar. 5, 1992

Related U.S. Application Data

[62] Division of Ser. No. 581,811, Sep. 13, 1990, Pat. No. 5,120,780.

[51] Int. Cl.⁵ .................................................. C07F 7/04
[52] U.S. Cl. ..................................... 556/413; 556/429; 556/482; 556/418; 556/419; 556/420; 556/421; 556/427; 556/437
[58] Field of Search ............... 556/419, 429, 482, 413, 556/420, 421, 427, 437

[56] References Cited

U.S. PATENT DOCUMENTS

| | | | |
|---|---|---|---|
| 2,661,349 | 12/1953 | Caldwell et al. | 536/63 |
| 3,488,318 | 1/1970 | Stewart et al. | 524/264 |
| 3,865,768 | 2/1975 | Mohr | 524/228 |
| 3,933,711 | 1/1976 | Motsinger | 524/230 |
| 3,969,299 | 7/1976 | Burns et al. | 524/262 |
| 4,119,477 | 10/1978 | Cohen et al. | 106/99 |
| 4,147,833 | 4/1979 | Eilerman et al. | 428/378 |
| 4,284,538 | 8/1981 | Graham | 524/47 |
| 4,341,877 | 7/1982 | Das et al. | 523/409 |
| 4,394,475 | 7/1983 | Temple et al. | 524/262 |
| 4,448,910 | 5/1984 | Haines et al. | 523/402 |
| 4,448,911 | 5/1984 | Haines et al. | 523/411 |
| 4,455,400 | 6/1984 | Johnson | 523/454 |
| 4,489,131 | 12/1984 | Black et al. | 428/391 |
| 4,863,992 | 9/1989 | Wengrovius et al. | 524/731 |
| 4,963,614 | 10/1990 | Ito et al. | 524/495 |

FOREIGN PATENT DOCUMENTS

| | | | |
|---|---|---|---|
| 123755 | 9/1975 | Japan | 524/261 |
| 95631 | 6/1983 | Japan . | |

OTHER PUBLICATIONS

CA 102(11):92311C; Preparation and characterization of thionyl chloride-activated succinamidopropyl-glass as a covalent immobilization matrix; J. Appl. Biochem: 6(4), 240-50; DuVal et al., 1984.

CA 75(1):6003y; Organosilicon derivatives of acid amides; Izv. Akad. Nauk SSSR; Ser. Khim, (11), 2538-43; Zhdanov et al.; 1970.

*Primary Examiner*—Joseph L. Schofer
*Assistant Examiner*—J. M. Reddick
*Attorney, Agent, or Firm*—Eugene Zagarella, Jr.; Edwin M. Szala

[57] ABSTRACT

An aqueous glass fiber sizing composition acetate file former and an effective amount of a lubricant additive having the formula:

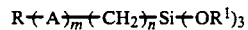

where R is an alkyl or alkenyl group of 6 to 20 carbons, A is a divalent organic—S—or—NH—group, $R^1$ is an alkyl group of 1 to 4 carbons, m is or 1 and n is 0 to 10 with the proviso that when n is O, m is also O.

9 Claims, No Drawings

SYNTHETIC ORGANOSILANE COMPOUNDS USEFUL AS LUBRICANTS IN GLASS SIZING COMPOSITIONS

This application is a division of application Ser. No. 07/581,811, filed Sep. 13, 1990 and now U.S. Pat. No. 5,120,480.

BACKGROUND OF THE INVENTION

The present invention relates to a sizing composition used in glass fiber reinforced resin and plastic articles and to selected synthetic organosilane lubricants incorporated therein.

It is well known to use glass fibers to reinforce polymeric materials. These glass fibers are provided in various forms such as mats including chopped strand mats and continuous strand mats; rovings which are bundles of glass fiber strands wound up in parallel, i.e. without twist; woven rovings; and chopped and milled fibers. They are produced by a process called forming wherein fibers are drawn at a high rate of speed from molten glass through tiny orifices or tips in a heated platinum bushing (a fiber-drawing furnace) then attenuated into a multi-filament strand. The glass fibers so produced must be protected from interfilament abrasion during formation and processing and must be made compatible with the polymeric materials they are to reinforce. This is usually accomplished by treating the glass fibers with a sizing composition.

Basically, a fiber size must provide the following characteristics to the strand of filaments: a) good adhesion between glass fiber and polymer; b) good cohesion between filaments within a strand; c) certain handling characteristics like hardness, softness, choppability, etc. imparted by careful selection in terms of type and quantity of components; d) protection of the strand during its various processing stages and e) other desired characteristics such as antistatic and electrical properties.

Sizing compositions are well known in the art and include the starch based sizes used in the formation of glass fiber weavers yarns and fiber sizes designed for the reinforcement of thermosetting resins and thermoplastics. The latter type sizes, sometimes referred to as plastics size, typically comprising a film-forming polymeric or resinous component, a coupling or keying agent and a lubricant. The majority of fiber sizes for general purpose reinforcing materials use polyvinyl acetate as a film-former, Polyesters, epoxides, polymethyl methacrylate and polystyrene are also used as film-formers, sometimes alone and sometimes as copolymers or blends with polyvinyl acetate. Coupling or keying agents (also called adhesion promotors) improve the bond between the polymeric resin and glass and typically are organo-metallic, in most cases organo-silicon compounds. Common lubricants used are cationic surface-active agents such as a fatty acid amine or a fatty acid quaternary ammonium compound.

Many different sizing compositions, having formulations which are adapted to provide the various properties desired in the glass fiber products, have been developed. Typical compositions are disclosed in "The Manufacturing Technology of Continuous Glass Fibers" by K. L. Lowenstein, second edition, Elsevier Science Publishing Company, 1983 wherein a number of film formers, coupling or keying agents, lubricants and other components such as plasticisers, emulsifiers, antistatic agents and miscellaneous other materials are disclosed.

More specific glass fiber sizing compositions are disclosed in the following patents. In U.S. Pat. No. 3,865,768 issued Feb. 11, 1975, a glass sizing composition to provide lubricity in the formation of rovings and which is a compatible with polyester resins is disclosed and comprises a poly(vinyl acetate) latex film former, a polyester compatible silane, at least one alkyl amide reaction product of an alkyl carboxylic acid and an ethylene amine and a nonionic surfactant derived from halogentated fatty acid containing oil. U.S. Pat. No. 3,933,711 issued Jan. 20, 1976 discloses an aqueous sizing composition comprising polyvinyl acetate, a fatty acid amide lubricant, methacrylate chronic chloride and gamma (ethylene diamine) propyl trimethoxy silane. U.S. Pat. No. 4,284,538 issued Aug. 18, 1981 discloses an aqueous dispersion sizing composition containing a cationic imidazoline; an aliphatic aromatic and/or polymeric ester and polyethylene.

Other sizing compositions are disclosed in U.S. Pat. No. 4,341,877 issued Jul. 27, 1982 which shows a composition comprising an epoxidized polar thermoplastic copolymer, an organosilane coupling agent and a nonionic, cationic or anionic lubricant and in U.S. Pat. No. 4,448,910 issued May 15, 1984 wherein the composition includes an emulsified epoxy resin and 3-chloropropyl-trimethoxy silane as the coupling agent. U.S. Pat. No. 4,489,131 issued Dec. 18, 1984 discloses a size for glass fibers employed in reinforcing polypropylene comprising an oxidized polyolefin, a carboxylated high molecular weight elastomer as a film former, an amino silane and a selected organic acid.

In producing glass reinforced fibers, as disclosed above, many different sizing compositions have been used. While lubricants to aid in the processibility of the glass fibers are generally used, in many instances they can have a detrimental effect on same properties. For example, they reduce the strength and stiffness of a glass reinforced product.

Accordingly, there is the need for a sizing composition, for use in producing glass fiber reinforced articles, which contains a lubricant and which has improved strength and stiffness properties.

SUMMARY OF THE INVENTION

This invention relates to an aqueous sizing composition for glass fiber reinforced polymeric materials comprising a polyvinyl acetate film former and an effective amount of a lubricant additive having the formula:

$$R-(A)_m-(CH_2)_n-Si-(OR^1)_3 \qquad (I)$$

where R is an alkyl or alkenyl group, straight or branched chain, having 6 to 20 carbon atoms, A is a divalent organic, —S— or —NH—group, $R^1$ is an alkyl group of 1 to 4 carbon atoms, m is 0 or 1 and n is 0 to 10 with the proviso that when n is 0, m is also 0.

Another embodiment of this invention involves the novel organo silane compounds (I) used in the aforementioned sizing composition where m is 1.

DETAILED DESCRIPTION OF THE INVENTION

The organosilane compounds (I) used in the glass fiber sizing compositions of this invention can be prepared by reacting selected silane compounds with organo compounds having a long chain hydrocarbon group R, both compounds containing reactive sites.

More particularly, the organosilane compounds (I) can be prepared in three or more ways. The first type of reaction is between an amine or sulfhydryl containing trialkoxysilane and a long chain alkyl or alkenyl containing compound having a reactive site such as an epoxide, an isocyanate, a halide, an ester or an anhydride. The second type of reaction is one between an epoxy containing trialkoxy silane and a long chain alkyl or alkenyl containing compound having a reactive site such as an amine, a carboxylic acid or a sulfhydryl. The third type of reaction is one between a methacryloxyalkyl containing trialkoxysilane and a long chain alkyl or alkenyl containing compound having a reactive site such as an amine or a sulfhydryl.

In the above formula I representing the organosilane compounds, R is an alkyl or alkenyl group having 6 to 20 carbon esters, preferably 8 to 20 carbons, A is a divalent organic, —S— or —NH—group, $R^1$ is an alkyl group of 1 to 4 carbon atoms, preferably 1 to 2 carbons, m is 0 or 1, preferably 1 and n is 0 to 10, more particularly 1 to 10 and preferably to 1 to 5 with the proviso that when n is 0, m is also 0.

As noted above, A is a divalent organic, S—or —NH—group and is the residual component resulting from the reaction of selected silane compounds with organo compounds that contain reactive sites. When following such reactions the divalent A group will have a typical structure such as:

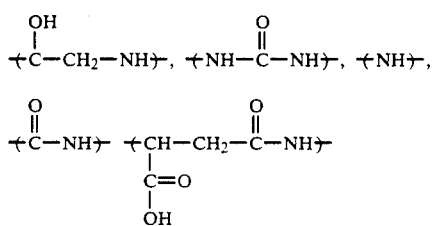

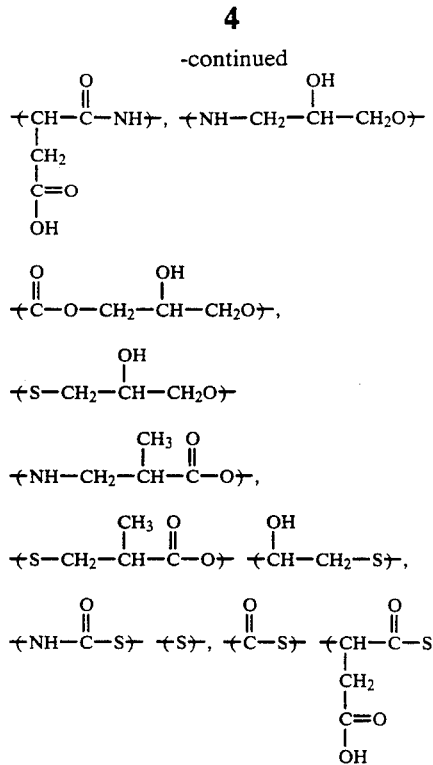

It is further noted that the organosilane compounds (I) used in the glass fiber sizing compositions may comprise a mixture of such compounds and this may result from the method of preparation as illustrated below.

The preparation of the organosilane compounds (I) by reacting a signal compound with a long chain organo compound can be illustrated by the following reaction wherein octenyl succinic anhydride is reacted with aminopropyltriethoxy silane.

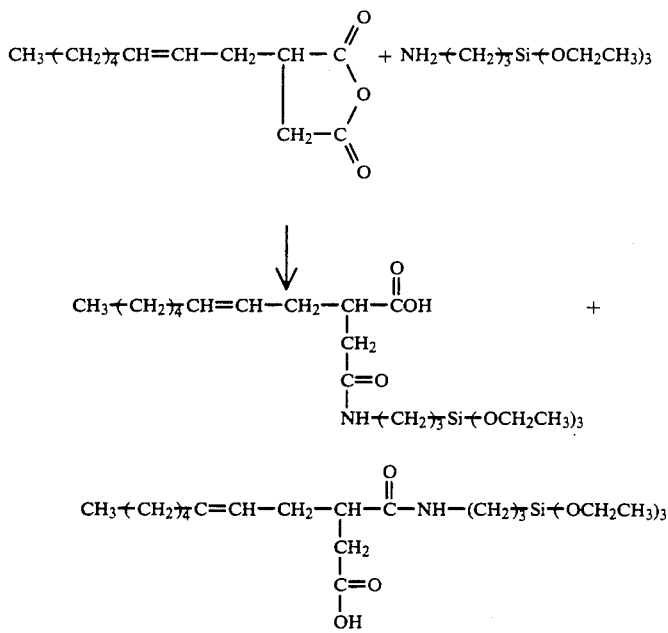

The long chain organo compounds which may be used in preparing the organosilane compounds (I) have the following general formula:

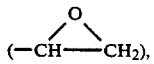

where $R^2$ is an alkyl or alkenyl group having 6 to 20 carbon atoms, preferably 8 to 20 carbons and may be a straight or branch chain. X is a group having a reactive site such as an amine (—NH$_2$), a carboxyl (—COOH), a sulfhydryl or mercapto (—SH), an epoxy

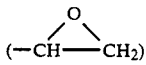

an isocyanate (—N=C=O), a halide, an ester (—COOR$_4$) and an anhydride.

The organosilanes used in preparing the organosilane compounds (I) have following general formula:

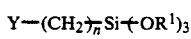

where $R^1$ is an alkyl of 1 to 4 carbon atoms, preferably 1 to 2 carbons, n is 0 to 10, preferably 1 to 5 and Y is a group having a reactive site such as an amine (—NH$_2$), a sulfhydryl or mercapto (—SH), an epoxy

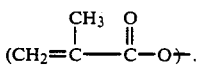

or a methacryloxy

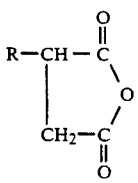

One group of especially useful long chain organo compounds are the anhydrides, particularly the alkenyl succinic anhydrides (ASA) having the following general formula:

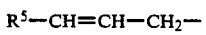

where R is an alkyl or alkenyl group having 6 to 20 carbon atoms, preferably 8 to 20 carbons. The R group may be straight or branched chain and therefore would include substituents of structures such as:

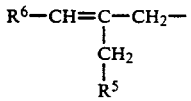

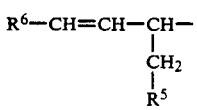

where $R^5$ and $R^6$ may be the same or different alkyl groups. Anhydride compounds of this type are further described in U.S. Pat. No. 2,661,349 issued Dec. 1, 1953 to Caldwell et al.

One group of especially useful organosilanes as described above are the amine containing compounds which for example may be reacted with a long chain organo anhydride compound resulting in an organosilane of the structure where A in formula I is:

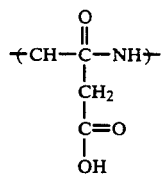

or

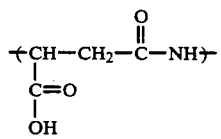

It is further noted that organosilane compounds (I) of the type where m is 0 are known in the art as disclosed for example in U.S. Pat. Nos. 3,488,318 issued Jan. 6, 1970 and 4,863,992 issued Sep. 5, 1989.

Polyvinyl acetate is the film-former used in the sizing composition of this invention. It may be used alone or may include copolymers such as polyesters, epoxies, polymethyl methacrylate and polystyrene.

A keying or coupling agent (also referred to as an adhesion promoter) is generally included in the sizing composition. While in some instances, sizing compositions containing the organosilane agents (I) do not need a keying agent, usually a compound of this type is included. Keying/coupling agents typically used are organo-metallic and in most cases organo-silicon compounds. Illustrative keying/coupling agents that may be used are methacrylate chromic chloride and other metal complexes and organosilanes such as vinyltriethoxy silane, gamma-meathacryloxypropyltriethoxy silane and 3-aminopropyltriethoxy silane.

It is desired to adjust the pH of the sizing composition generally on the acid side to maintain a stable fiber size with good performance. This is usually in the pH range of about 2 to 7 and more preferably about 5 to 6.5 and can be accomplished by adding acetic acid.

Other conventional glass forming size additives such as plasticizers, surfactants, emulsifiers, antistatic agents, wetting agents, etc., may be included in the sizing composition of this invention if desired.

The amounts of components used in the sizing composition will vary within the typical ranges and depending on the desired properties of the sized fibers. Generally, the aqueous sizing composition of this invention will comprise from about 0.2 to 20% by weight of film-former, preferably about 0.5 to 5%; from about 0.05 to 3% of lubricating additive I, preferably about 0.1 to 1% by weight; from about 0 to 3% by weight of keying-/coupling agent preferably from about 0.1 to 1% and the balance being water. All of the above weight percents are based on the total weight of the sizing composition.

The sizing composition of this invention can be prepared using conventional techniques and means known in the art. The dilute aqueous sizing composition can be applied to glass fibers to form a size coating thereon by any convenient method, such as drawing the fibers to be sized across a rotating or stationary roll wet with sizing composition and then drying the composition so applied after collecting the fiber by winding onto a rotating collet or forming tube. Usually the sizing composition will be applied to glass fibers during continuous manufacture. This typically involves the drawing of molten glass into a plurality of filaments from a temperature controlled bushing located on the underside of a furnace. The whole emerging fan of individual fibers, called filaments, passes through a light water spray and then over an applicator which transfers a protecting and lubricating size onto the filaments before they are grouped together on a suitable means, such as a shaped shoe, into a bundle of filaments called a strand. The strand of fibers is then wound on a rotating cylinder, called a collet, and dried before further processing where they are converted into desired articles.

The following examples are further illustrative of the invention and are not intended to be construed as limitations thereof. All parts and percentages are given by weight and all temperatures in degrees Celsius unless otherwise noted.

EXAMPLE I

An amino organosilane compound of structure I was prepared by reacting octenyl succinic anhydride with aminopropyltriethoxy silane at room temperature for 2 hours. A clear liquid product having the following structure and identified as Product A, was obtained:

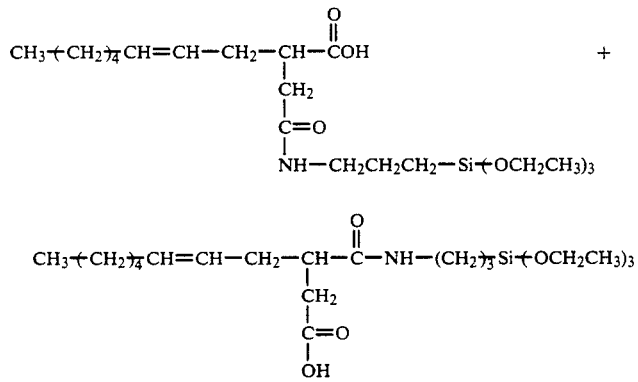

Another compound of structure I was prepared in a similar manner by reacting tetradecenyl succinic anhydride with aminopropyltriethoxy silane at 60° C. for 1.5 hours. This product, called Product B had the following structure:

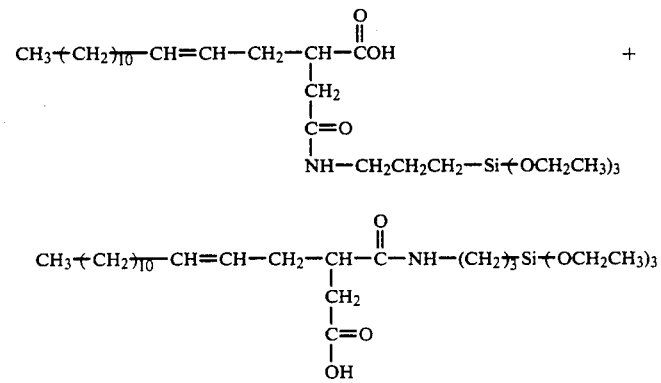

EXAMPLE II

Glass fiber sizing compositions were prepared using the products obtained in Example I (Products A and B), a file-former, Resyn 1971 an epoxidized polyvinylacetate copolymer (3% epoxy functionality) available from National Starch and Chemical Co., an adhesion promotor, A-174 which is gamma-methacryloxypropyltriethoxysilane available from Union Carbide Corp. and having the following formulation:

| | |
|---|---|
| Resyn 1971 | 9.50% |
| Product A or B | 0.3% |
| A-174 | 0.7% |
| Acetic Acid | 0.05% |
| Water | 89.45% |

Glass fibers were sized with the above described sizing compositions. The glass was air dried and cured at 130° C. and layered into a curing polyester resin and left overnight. Laminates comprising twelve layers of glass (about 0.1 inches) were made and heat cured at 150° C. The laminates were then sawed into 1"×5" test bars and broken on an Instron apparatus using a three point loading test to determine the breaking strength. Samples were also boiled for 24 hours before testing to check their moisture and temperature resistance. The results are shown in the following table where a comparative sample using a resin formulation wherein Emery 6760, a standard lubricant comprising an amine salt of fatty acid, was substituted for the lubricant Product A or B. Additional samples without the silane adhesive promotor (A-174) were also tested.

TABLE I

| Conditions | Breaking Strength (pounds) | | | |
| --- | --- | --- | --- | --- |
| | Product A | Standard | Product B | Standard |
| Test Sample w/adhesion promotor | | | | |
| Dry | 97.5 | 83.0 | 92.0 | 86.4 |
| 24 hr. boil | 59.3 | 44.2 | 57.0 | 45.0 |
| Test Sample w/o Adhesion Promotor | | | | |
| Dry | 62.6 | 60.6 | 63.1 | 60.1 |
| 24 hr. boil | 24.3 | 23.0 | 25.8 | 22.0 |

The results show that the sample sizing compositions of this invention using Product A or B clearly have a higher breaking strength than the comparative sample using the standard lubricant both with and without use of the adhesion promotor. The compositions of this invention also exhibited greater stiffness than the standard comparative sample.

EXAMPLE III

An organosilane compound of structure I was prepared by reacting isostearic acid with gamma-glycidoxypropyltriethoxysilane. The product (C) having the following structure was obtained.

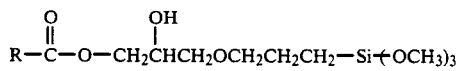

where R is $C_{17}H_{35}$.

EXAMPLE IV

An organosilane compound of structure I was prepared by reacting oleyl amine with gamma-glycidoxypropyltrimethoxysilane to give product D having the following structure:

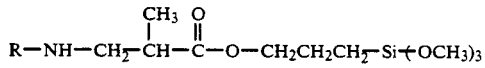

where R is $C_{18}H_{35}$.

EXAMPLE V

An organosilane compound of structure I was was prepared by reacting dodecanethiol with gamma-glycidoxypropyltrimethoxysilane. The product (E) having the following structure was obtained.

when R is $C_{12}H_{25}$.

EXAMPLE VI

Glass fiber sizing compositions similar to those in Example II were prepared using the products of Examples III and IV, ie. C and D in amounts of 0.3% by weight without an adhesion promotor. The breaking strength of the unboiled samples was determined as in Example II using an Instron apparatus.

The breaking strength of the sample containing Product C was 90.2 lbs compared to 85.1 lbs for a resin formulation wherein Emery 6760, a standard lubricant comprising an amine salt of fatty acid, was substituted for the lubricant Product C (both results represent an average of five measurements).

The breaking strength of the sample containing Product D was 95.5 lbs compared to 82.6 for the comparative sample (both results representing an average of five measurements).

The results show the higher breaking strength for sizing compositions of this invention containing Products C and D as compared to the test samples containing standard lubricants.

What is claimed is:

1. An organosilane compound having the structure:

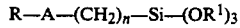

where R is an alkyl or alkenyl group, straight or branched chain, having 6 to 20 carbon atoms, $R^1$ is an alkyl group of 1 to 4 carbon atoms, A is a —S—, —NH—or divalent organic group which contains an O, S or N group and n is 1-10.

2. The compound of claim 1 wherein the A group has the structure selected from the group consisting of:

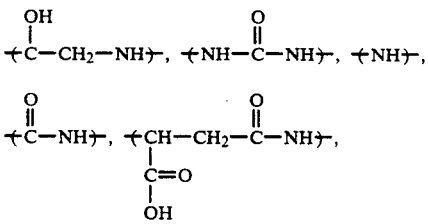

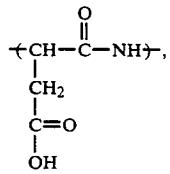

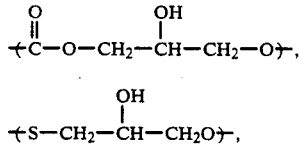

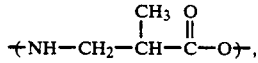

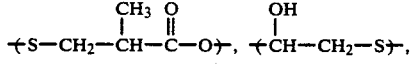

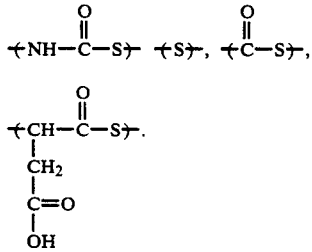

3. The compound of claim 2 wherein R has 8 to 20 carbon atoms.

4. The compound of claim 3 wherein $R^1$ has 1 to 2 carbon atoms and n is 1 to 5.

5. The compound of claim 1 wherein R has 8 to 20 carbon atoms.

6. The compound of claim 5 wherein A is a divalent organic group selected from the group consisting of:

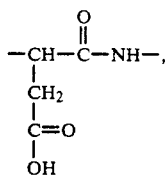

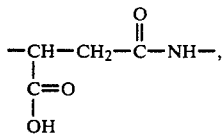

and mixtures thereof.

7. The compound of claim 6 where R has the following structure:

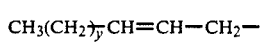

where y is 4 or 10 and n is 3.

8. The compound of claim 5 wherein $R^1$ has 1 to 2 carbon atoms and n is 1 to 5.

9. The compound of claim 8 wherein A is a divalent organic group having the structure:

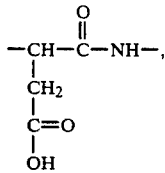

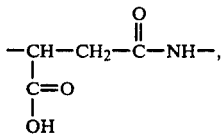

and mixtures thereof, and R has the following structure:

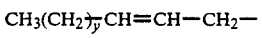

where y is 4 or 10 and n is 3.

* * * * *